Sept. 19, 1939.   A. BIKKERS   2,173,294
CONTINUOUS ABSORPTION REFRIGERATION MACHINE
Filed Dec. 14, 1937
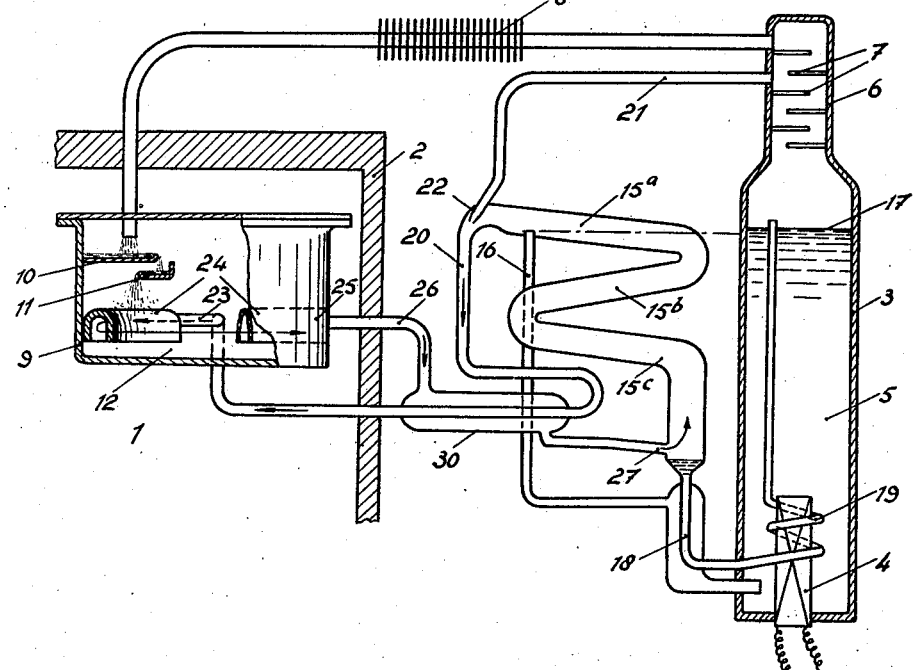
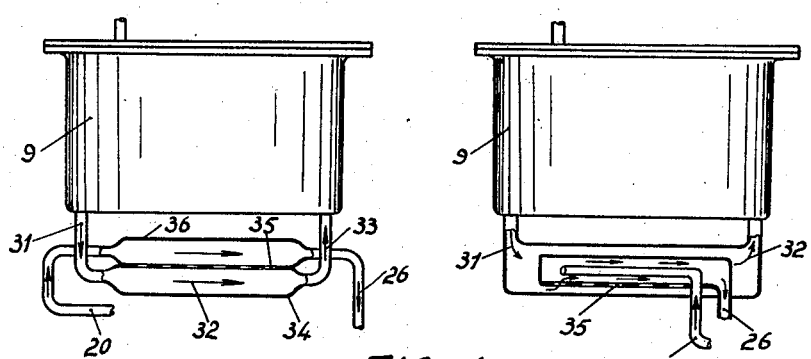
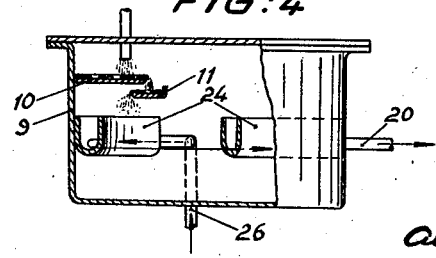
Inventor:
Alexander Bikkers,
By Potter, Pierce & Scheffler,
Attorneys Patented Sept. 19, 1939

2,173,294

UNITED STATES PATENT OFFICE 2,173,294

CONTINUOUS ABSORPTION REFRIGERATION MACHINE

Alexander Bikkers, The Hague, Netherlands, assignor to Willem Frederik Poel, Haarlem, Netherlands Application December 14, 1937, Serial No. 179,774
In the Netherlands September 1, 1936

9 Claims. (Cl. 62—119.5)

The invention relates to continuous absorption machines containing an inert auxiliary gas which serves to equalize the differences in the refrigerant pressure within the machine. More specifically the invention relates to absorption machines of the kind referred to in which both the absorber and the evaporator are operated substantially independently of one another with respect to the circulation of the gas mixtures therein, and the refrigerant is conveyed from the evaporator to the absorber by diffusion at a point where the absorber system is in open communication with the evaporator system. In this manner only the cold contained in the refrigerant is transmitted from the evaporator to the absorber and not the cold contained in the inert gas contained in the evaporator. Although cold conveyed from the evaporator to the absorber by circulating gas may be regained or recovered to some extent by providing a heat exchanger between the relatively warm gases passing from the absorber to the evaporator and the cold gases passing from the evaporator to the absorber, it will be understood that all losses of cold never can be prevented and that the losses will be low only when the amounts of gas circulated between evaporator and absorber are small.

It is the object of the invention to accelerate transmission of the refrigerant from the evaporator to the absorber.

It is also an object of the invention to increase the capacity of evaporators in machines of the kind referred to and thus to increase the cold producing capacity of machines of the kind referred to in general.

Furthermore it is an object of the invention to make the process of diffusion more complete, viz. to cause the gases passing from the evaporator to the absorber to consist as far as possible of pure refrigerant only.

It is a further object of the invention to increase the efficiency of absorption machines of the kind referred to.

Embodiments of the invention are illustrated in the attached drawing.

In this drawing:

Fig. 1 is a diagrammatic illustration of an absorption machine according to the invention, the generator in section and the evaporator partly in section.

Fig. 2 is an elevation with parts in section of another embodiment of the evaporator used in the machine according to Fig. 1.

Fig. 3 is an elevation of another modification of the evaporator and

Fig. 4 is an elevation partly in section of another modification of the evaporator in which the inert gas as such has a higher density than the refrigerant, viz. than the mixture of inert gas and the refrigerant.

Referring now to Fig. 1 of the drawing, 2 designates the insulated wall of a cabinet, the interior space 1 of which is to be cooled.

Mounted outside the said cabinet 2 is a generator, boiler or gas expelling vessel 3 provided with an electric heating device 4. This heating device may be replaced by a device using other sources of heat, such as gas burners or the like. The vessel 3 contains the refrigerant absorbing substance 5. Water or better an aqueous solution may be chosen as the absorbent, e. g. when the refrigerant or working medium is ammonia ($NH_3$), but other systems may be used (water and sulphurous acid and so on).

The generator is provided with a liquid separator or rectifier 6, which may be of any well known construction. In the embodiment shown it has a plurality of baffles 7 by which particles of solution carried by the flow of refrigerant vapour are separated and returned to the body of liquid 5.

The expelled refrigerant gas thereupon passes through the condenser 8 in which it is liquefied by the cooling action of the outer air or of a cooling agent, such as water.

The refrigerant then reaches the evaporator 9 mounted within the cabinet 2. Means are provided therein for facilitating the evaporation of the liquefied refrigerant. In Figs. 1 and 4 such means are designated by the numerals 10 and 11. It will be understood, however, that sufficient evaporation could be attained by other suitable means.

The numeral 10 designates a flat plate having an upturned edge over which the refrigerant liquid flows, falling upon the plate 11 having also an upturned edge. Both cascades formed in this manner sufficiently agitate the refrigerant liquid to cause full evaporation.

In the embodiment according to Fig. 1 the absorption machine contains as an inert auxiliary gas a relatively light gas, viz. a gas having a low density, such as hydrogen. Part of this gas enriched with refrigerant by evaporation thus will have the tendency to sink down in the evaporator. The low temperature of this part of the gas due to the evaporation of the refrigerant also promotes its sinking movement. The mixture rich in refrigerant thus will accumulate at the bottom space 12 of the evaporator.

The absorber in the machine according to Fig. 1 is formed by three branches 15a, 15b and 15c of the zigzag tube. Absorption liquid enters the absorber through the conduit 16 at the top, said top lying a little underneath the level 17 of the liquid in the generator 3 so that the liquid freely can flow from the generator 3 through the tube 16 into the absorber. This liquid flows down within the absorber enriching itself with refrigerant and being heated to some extent by the absorption process. Thereafter it flows through the tube 18 in heat exchange relation with the liquid flowing in tube 16 and is thus further preheated and thereupon passes through the coil 19 in close proximity to the heating element 4. This special heating of the contents of the tube 18 makes the latter act as a heat pump by which the liquid leaving the absorber is lifted to the level 17 of the liquid in the generator 3.

The gas which is poor in refrigerant passes through the tube 20 following a path indicated by arrows in the drawing. It may be gathered from the drawing that a continuous circuit is formed through the absorber, the tube 20, pipe 23, member 24, pipe 26, the outer chamber of heat exchanger 30 and outlet 27. It may be necessary to start or to maintain this circulatory flow by separate means if the natural circumstances of difference in temperature and difference in density are not sufficient therefor. In general such artificial driving means for maintaining the said circulation will be advantageous because only in that event will the circulation be controllable and adjustable. In the drawing it is shown how the circulation can be driven by injection of gas under pressure taken e. g. from the high pressure part of the machine, such as the rectifier or separator 6. A small quantity of refrigerant vapour is led away from this point of high pressure through a tube 21 and injected through the nozzle 22 into the tube 20 to support the flow of the medium in the desired direction.

The absorber gas mixture flowing through the tube 20 enters the evaporator 9 at 23, but the said gas mixture is not free to intermingle with the contents of the evaporator 9. This absorber gas, poor in refrigerant, enters a gutter-, U or similarly shaped member 24 having its openings downwards. This member is arranged near the bottom of the evaporator space 12 in any suitable manner, e. g. extending along the walls of the evaporator 9. It ends at 25, where it communicates with the passage 26 through which the gas can reach the absorber at 27. The gutter shaped member 24 is continuous but is shown in Fig. 1 with a portion broken away to reveal the pipe 23.

Practice has shown that the relatively light absorber gas mixture tends to rise in the gutter-shaped member 24, due to the fact that it floats on the relatively heavy gas at the bottom of the evaporator. It is the same phenomenon as observed when oil floats on water. Nevertheless there is a great difference in partial pressure of the refrigerant vapour in the poor absorber gas mixture flowing through the passage 24 and the rich evaporator gas mixture in the bottom space 12 of the evaporator. An effective diffusion of refrigerant therefor will occur from the evaporator gas mixture into the absorber gas mixture, because the effective surface is large (the whole surface at the underside of the member 24) and the length of the path which the molecules of the refrigerant have to traverse when passing over from one gas into the other is very short, no inactive layer of substantial thickness being between the two gases. Moreover the difference in partial pressure is maintained continuously high, as poor absorber gas is continuously supplied to the member 24 and rich evaporator gas continuously sinks down to the bottom space 12 of the evaporator.

If the difference in density between the two gases were too small to prevent intermingling, it would be possible to cover the downwardly directed opening of the gutter-shaped member 24 by a wall or partition preventing intermingling of the gases but permitting diffusion of the refrigerant from one gas into the other. Such a wall or partition could be formed by porous sheets such as fabrics or by perforated sheets, such as perforated metal sheets. Also grids or the like could be used and also the opening could be formed as slots. The invention is not restricted to any particular embodiment in this respect.

The absorber gas, thus enriched in refrigerant and leaving the evaporator through the passage 26, is only cooled down due to contact with the evaporator gases and due to the cold refrigerant taken up. By means of the heat exchanger 30 much of this cold is recovered so that only a very small amount of cold will be transmitted from the evaporator to the absorber, which increases the efficiency of the absorption machine considerably.

In Figs. 2, 3 and 4 like numerals designate like parts, also in respect of Fig. 1. The evaporator 9 in Fig. 2 is provided with a circulatory passage leaving its interior space at one side and entering into it again at the other side. By causing the evaporation taking place somewhat unsymmetrically within the evaporator it will be possible to have a continuous flow of gas rich in refrigerant established through the circulatory passage according to the arrows 31, 32, 33. The circulatory passage referred to includes a box-like chamber 34 covered by a perforated or porous plate 35. At the other side of the said plate 35 another box-like chamber 36 is provided. This chamber 36 is included in the circuit of the absorber gases, thus inserted between the tubes 20, 26. At either side of the plate 35 there is thus a flow of gases which gases do not intermingle when the lighter gas is flowing above the plate 35 and when both gases flow in the same direction. There will be, however, an effective diffusion from the chamber 34 through plate 35 into the chamber 36 due to the rather great difference in partial pressure of the refrigerant.

In the modification shown in Fig. 3 a horizontal part of the tube 20 is arranged within a horizontal enlarged portion of the tube 26. The contents of the tube 20 are warmer than those of the tube 26 and therefore the said arrangement acts as a heat exchanger. Diffusion takes place through the plate 35.

Fig. 4 shows a modification of the evaporator which may be used if the refrigerant has a lower density viz. is lighter than the inert auxiliary gas (e. g. if nitrogen is used as an inert auxiliary gas and ammonia as the refrigerant). In this event the richer evaporator gases are at th top of the evaporator and therefore the gutter-shaped member 24 is arranged at a higher level than in the case of Fig. 1. Moreover the opening of the member 24 is directed upwardly, the rich evaporator gases floating on the heavier absorber gases. The process is otherwise similar to that described with reference to Fig. 1.

It will be understood that the invention is not restricted to the embodiments shown. If there is no great difference in specific weight between the rich and the poor gas mixture it would not be necessary e. g. to arrange the "diffusion" plane, i. e. the geometric separation between both mixtures, horizontally. In that event it even could be a vertical plane on either side of which the gases flow or circulate so that these gases are not one above the other but side by side. The said plane could take, however, also an inclined position or have a curved form, e. g. that of a cylinder.

Means may be provided to force the gases to flow as near as possible along the diffusion plane or partition, such as vanes or the like.

What I claim is:

1. In a continuous absorption machine containing an inert gas equalizing the differences in the refrigerant pressure, an evaporator enclosing a space within which an inert gas carrying refrigerant circulates and an absorber circuit within which an inert gas carrying refrigerant circulates part of the evaporator space in which the inert gas is rich in refrigerant being in free communication with a part of the absorber circuit in which the inert gas, poor in refrigerant, flows in a substantially horizontal direction, the communication being established along a plane, the inert gas carrying refrigerant having the greatest density being underneath, the other above the said plane.

2. In a continuous absorption machine containing an inert gas equalizing the differences in the refrigerant pressure, an evaporator enclosing a space within which an inert gas carrying refrigerant circulates and an absorber circuit within which an inert gas carrying refrigerant circulates part of the evaporator space in which the inert gas is rich in refrigerant being in free communication with a part of the absorber circuit in which the inert gas, poor in refrigerant, flows in a substantially horizontal direction, the communication being established along a plane, both gas mixtures on either side of the said plane flowing in parallel and in concurrent directions.

3. In a continuous absorption machine containing an inert gas equalizing the differences in the refrigerant pressure, an evaporator enclosing a space within which an inert gas carrying refrigerant circulates and an absorber circuit within which an inert gas carrying refrigerant circulates part of the evaporator space in which the inert gas is rich in refrigerant being free communication with a part of the absorber circuit in which the inert gas, poor in refrigerant, flows in a substantially horizontal direction, the communication being established along a plane, the said plane being materialized by a partition having a plurality of openings.

4. In a continuous absorption machine containing an inert gas equalizing the differences in the refrigerant pressure, an evaporator enclosing a space within which an inert gas carrying refrigerant circulates and an absorber circuit within which an inert gas carrying refrigerant circulates part of the evaporator space in which the inert gas is rich in refrigerant being in free communication with a part of the absorber circuit in which the inert gas, poor in refrigerant, flows in a substantially horizontal direction, the communication being established along a plane, the said plane being materialized by a porous partition, permitting diffusion of the refrigerant from the evaporator space into the absorber circuit.

5. In a continuous absorption machine containing an inert gas serving to equalize the differences in the refrigerant pressure, an absorber provided with a conduit connecting one side of the absorber with the other side and constituting with the absorber a continuous circuit for the inert gas carrying refrigerant to the absorber, a vaporizer comprising a chamber, said conduit passing through said chamber and being gutter-shaped and having one side open to free communication with said chamber.

6. A continuous absorption machine as defined in claim 5 in which the inert gas has a higher density than the refrigerant and in which the open side of the gutter-shaped portion of the conduit within the chamber is disposed upwardly.

7. A continuous absorption machine as defined in claim 5 in which the inert gas has a lower density than the refrigerant and in which the open side of the gutter-shaped portion of the conduit within the chamber is disposed downwardly.

8. An absorption machine of the type in which an inert gas is used to equalize the differences in refrigerant pressure comprising a vaporizer and an absorber, an external conduit connecting opposite sides of the absorber and constituting with the absorber a continuous path for the circulation of inert gas carrying refrigerant to the absorber, a substantially horizontal portion of said conduit traversing the vaporizer and being open on one side and closed on the other side within the vaporizer, the open side of the conduit exposing the gases therein to diffusing contact with the gases within the vaporizer, the closed side of said conduit being disposed to prevent vertical movement of the gases therein depending upon their density relative to the density of the gases in the vaporizer.

9. In a continuous absorption machine containing an inert gas serving to equalize the differences in the refrigerant pressure in different parts of the machine, an absorber provided with inlet and outlet connections for the absorbent medium and with a conduit connecting one side of the absorber with the other side, said conduit constituting with the absorber a continuous circuit for the inert gas carrying refrigerant to the absorber, an evaporator comprising an assembling space for evaporator gases rich in refrigerant, the said assembling space being situated with respect to an evaporating space so as to cause the inert gas in the evaporator after having been enriched with refrigerant by evaporation of the latter to pass to the said assembling space without leaving the evaporator system, the said conduit contacting in a horizontal portion thereof with the said assembling space, communication being established in the contacting area so as to permit diffusion between the gas mixtures in the said conduit and the said assembling space.

ALEXANDER BIKKERS.

CERTIFICATE OF CORRECTION.

Patent No. 2,173,294. September 19, 1939.

ALEXANDER BIKKERS.

It is hereby certified that error appears in the printed specification of the above numbered patent requiring correction as follows: Page 3, first column, lines 24, 39, 53 and 62, claims 1, 2, 3 and 4 respectively, after the word "circulates" insert a comma; line 54, claim 3, before "free" insert in; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.